United States Patent
Piringer et al.

(10) Patent No.: US 9,266,774 B2
(45) Date of Patent: Feb. 23, 2016

(54) METHOD FOR BURNING PELLETIZED GOOD

(75) Inventors: Hannes Piringer, Beinwill am See (CH); Patrick Bucher, Dottikon (CH)

(73) Assignee: Maerz Ofenbau AG (CH)

( * ) Notice: Subject to any disclaimer, the term of this patent is extended or adjusted under 35 U.S.C. 154(b) by 0 days.

(21) Appl. No.: 14/124,512

(22) PCT Filed: May 9, 2012

(86) PCT No.: PCT/EP2012/058549
§ 371 (c)(1),
(2), (4) Date: Dec. 6, 2013

(87) PCT Pub. No.: WO2013/007413
PCT Pub. Date: Jan. 17, 2013

(65) Prior Publication Data
US 2014/0112848 A1   Apr. 24, 2014

(30) Foreign Application Priority Data
Jul. 8, 2011 (DE) .......................... 10 2011 051 675

(51) Int. Cl.
| F23G 7/00 | (2006.01) |
| C04B 2/12 | (2006.01) |
| C04B 35/626 | (2006.01) |
| C04B 2/02 | (2006.01) |
| F27B 1/02 | (2006.01) |
| F27B 1/10 | (2006.01) |

(52) U.S. Cl.
CPC ... *C04B 2/12* (2013.01); *C04B 2/02* (2013.01); *C04B 35/62675* (2013.01); *F27B 1/02* (2013.01); *F27B 1/10* (2013.01); *C04B 2235/3208* (2013.01); *C04B 2235/442* (2013.01); *Y02P 40/42* (2015.11)

(58) Field of Classification Search
CPC .............. F27B 1/005; F27B 1/08; F27B 1/16; F27B 1/20; C04B 2/12; C01B 31/088; B22C 5/08; F26B 17/145; C10J 2200/152; C10J 3/26
USPC .................................. 432/95, 96, 99
See application file for complete search history.

(56) References Cited

U.S. PATENT DOCUMENTS 3,156,557 A * 11/1964 Dahl et al. ...................... 75/320
4,274,836 A * 6/1981 Ban et al. ......................... 44/598
4,289,482 A * 9/1981 Fussl ............................... 432/96

(Continued)

FOREIGN PATENT DOCUMENTS

DE        3227395 A1    11/1983

OTHER PUBLICATIONS

Fussel, E., Zahn, F. 25 years of industrial development on the parallel flow regenerative lime shaft kiln. ZEMENT-KALK-GIPS. Bd. 35, Nr. 6, Jun. 1, 1982. Seiten 290-296, XP001264821. Whole document (relevant as background).

*Primary Examiner* — Gregory A Wilson
(74) *Attorney, Agent, or Firm* — Renner Kenner Greive Bobak Taylor & Weber

(57) ABSTRACT

According to the invention, the method for burning fragmented material is carried out in at least one shaft which comprises a preheating zone, a combustion zone and a cooling zone, coal having a swelling index > 1 being supplied via combustion lances, and the temperature of the coal in the combustion lances being maintained below a temperature value at which melting phases of the coal used are formed.

12 Claims, 3 Drawing Sheets

(56) References Cited

U.S. PATENT DOCUMENTS

Figure 1:
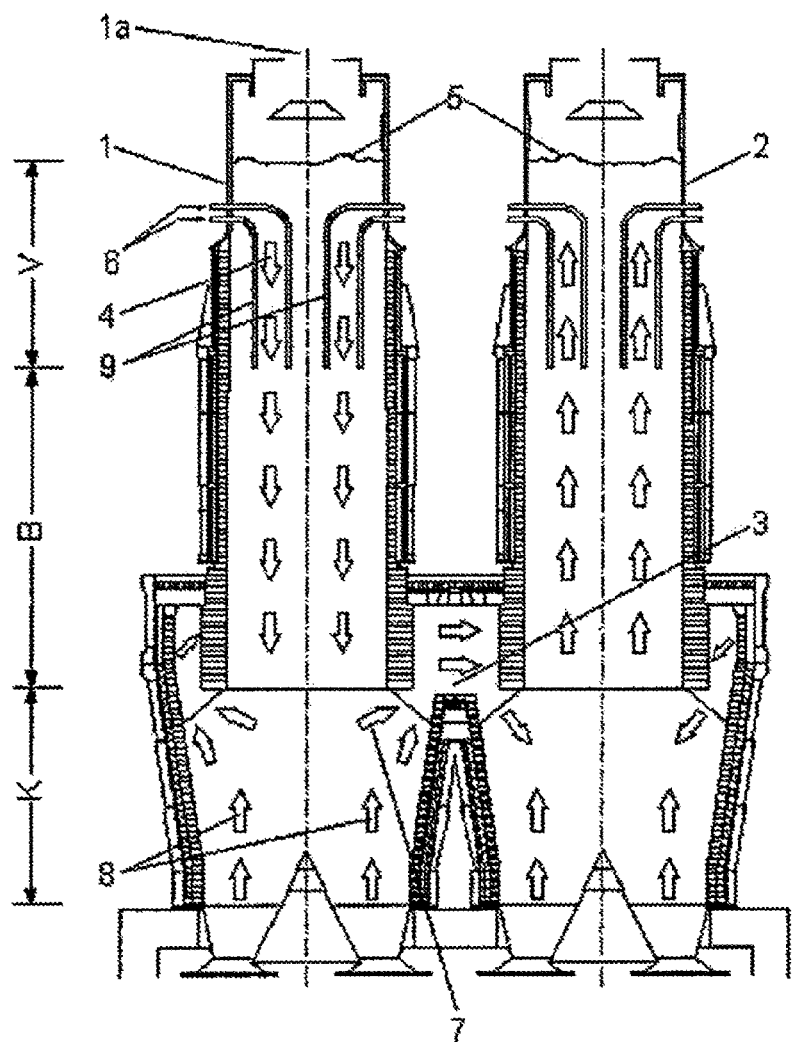

| | | | | |
|---|---|---|---|---|
| 4,305,788 A | * | 12/1981 | Weber et al. | 201/6 |
| 4,810,190 A | * | 3/1989 | Fussl | 432/95 |
| 5,460,517 A | * | 10/1995 | Scheibenreif et al. | 432/95 |
| 6,113,387 A | * | 9/2000 | Wilson et al. | 432/99 |
| 6,258,456 B1 | * | 7/2001 | Meyer | 428/403 |
| 6,453,831 B1 | * | 9/2002 | Zeisel | 110/347 |
| 2007/0128102 A1 | * | 6/2007 | Matviya | 423/448 |
| 2007/0254807 A1 | * | 11/2007 | Bisque et al. | 502/437 |
| 2008/0213708 A1 | * | 9/2008 | Cristea et al. | 431/7 |
| 2012/0066967 A1 | * | 3/2012 | Rinker | 44/591 |
| 2014/0112848 A1 | * | 4/2014 | Piringer et al. | 423/177 |

\* cited by examiner

METHOD FOR BURNING PELLETIZED GOOD

TECHNICAL FIELD

The invention relates to a method for burning fragmented material, in particular limestone, dolomite stone, magnesite brick or other carbonate stones, in at least one shaft which comprises a preheating zone, a combustion zone and a cooling zone, coal being supplied via combustion lances.

BACKGROUND OF THE INVENTION

The fuel costs in limestone burning are considerable and may amount to more than 50% of the production costs. Since coal is in most cases the most cost-effective energy carrier, most lime kilns are nowadays fired with coal. However, coal may be very different in terms of its properties. A high content of ash and sulphur is thus disadvantageous since the unhydrated lime is contaminated in an undesirable manner.

A particular feature of coal is its swelling index. From numerous practical tests, it is known that coal with a swelling index of more than 1.0 could previously not be used in lime kilns, in particular in co-current/counter-current regenerative lime kilns, since serious operational problems, such as, for example, clogging of the combustion lances, occurred. Owing to the limited usability of such coal in co-current/counter-current regenerative lime shaft kilns, either a rotary tubular kiln was previously used or petrol coke or liquid or gaseous fuels had to be used instead. However, rotary tubular kilns have the considerable disadvantage that they use from 50-100% more fuel than co-current/counter-current regenerative lime kilns and consequently considerably more $CO_2$ is thereby discharged into the atmosphere. The use of petrol coke is also disadvantageous since its sulphur content can be up to 10 times higher than that of coal, whereby other limitations are produced. Furthermore, liquid and gaseous fuels may not be available under some circumstances or may be significantly more expensive than coal.

DE 32 27 395 C2 discloses a method for producing briquettes for the fixed bed of a gasification reactor or shaft kiln, from 30 to 85% of non-caking raw coal and from 15 to 70% of the caking raw coal being mixed and subsequently formed into briquettes, the caking coal having a swelling index of ≥5.

SUMMARY OF THE INVENTION

An object of the invention is to provide a method for burning fragmented material by means of which the fuel costs can be reduced.

According to the invention, the method for burning fragmented material is carried out in at least one shaft which comprises a preheating zone, a combustion zone and a cooling zone, coal having a swelling index >1, in particular also >2, being supplied via combustion lances and the temperature of the coal in the combustion lances being maintained below a temperature value at which melting phases of the coal used are formed.

In this application, the swelling index is understood in accordance with the standard ASTM D720-91.

The coal is conventionally blown into the kiln in the form of coal dust pneumatically by means of combustion lances. The combustion lances are located in the preheating zone or the combustion zone of the shaft and are surrounded by fragmented material, in particular limestone. In this instance, the temperature of the fragmented material at the upper end of the preheating zone is approximately 100° C. whilst, at the lower end, it is approximately 50° C. below the calcination temperature which is typical for the material to be calcined and which, for limestone, is typically approximately from 750° C. to 800° C. Through the walls of the combustion lances, the heat of the fragmented material is transmitted from the outer side to the inner side, whereby the supplied coal is heated before it leaves the combustion lances and is automatically ignited outside them.

In the tests forming the basis of the invention, it has been found that coal having a swelling index >1 forms from a specific temperature melting phases which accumulate on the inner walls of the combustion lances and clog them after a short period of time. These deposits within the combustion lances can further ignite during the regenerative phase of a kiln shaft and thereby very quickly destroy the combustion lances. It has been found that precisely the volatile components of the coal having a swelling index >1 very quickly lead to occurrences of caking when a specific temperature is exceeded. During this phenomenon, there is first formed a melt phase which swells owing to the gas emission of the volatile components and quickly clogs the combustion lances. It has been found that the volatile components of the coal are discharged slowly in the range from 200 to 300° C. and are discharged rapidly from 450° C. However, depending on the type of coal, these values can vary significantly.

In the tests forming the basis of the invention using different coals, it has been found that the phase conversions in most cases begin only from 150° C. Swelling experiments in laboratory kilns have further shown that the swelling of the coal can begin at different temperatures, depending on the coal type. Typically, this temperature is approximately 250° C. However, if the temperature of the coal in the combustion lances is kept below the temperature value at which melt phases of the coal used are formed, coal having a swelling index >1 can be readily used. In particular in North America there is a significant occurrence of cost-effective coal which has an increased swelling index >1. With the method described above, this cost-effective coal can now be used in a lime shaft kiln, whereby the fuel costs can be reduced considerably with respect to the coal previously used.

The dependent claims relate to other embodiments of the invention.

The combustion lances are preferably arranged in the preheating zone or the combustion zone of the shaft and are in operational contact with the fragmented material located there in order to heat the coal. In this instance, the temperature of the coal in the combustion lances is advantageously kept below 250° C., preferably below 200° C. and in a most preferable manner below 150° C.

In order to comply with these temperature values, one or more of the measures set out below can be taken:
- the combustion lances are provided with an insulation in order to thereby significantly reduce the heat flow from the outer side to the inner side through the wall of the combustion lances, whereby the coal is accordingly heated less. This measure has the advantage that the thermal efficiency level of the lime kiln is not impaired;
- the combustion lances are cooled, the cooling being able to be carried out, for example, by means of a gas or a liquid. The combustion lances could, for example, be provided with a casing, which is cooled by means of water, thermal oil or air. This method also has only an insignificant influence on the thermal efficiency level of the lime kiln;
- the coal is cooled before being supplied to the combustion lances or the coal is supplied with a transport gas via the combustion lances, the temperature of the coal being adjusted by means of the quantity and/or temperature of the transport gas. Owing to these measures, the coal is heated to a correspondingly lower temperature within the combustion lances. However, the increase of the transport air quantity can be used only in a very limited manner since the thermal efficiency level of a co-current/counter-current regenerative lime kiln becomes correspondingly worse as the quantity of air increases and, furthermore, the exhaust gas temperature of the kiln rises accordingly;

non-combustible components, in particular CaO or $CaCO_3$-containing components, are introduced together with the coal into the combustion lances in order to adjust the temperature of the coal. To this end, it would be possible to add, for example, the dust from kiln exhaust gas filters, in order to increase the mass flow. Such a filter dust does not constitute a foreign material, with the result that it also does not lead to contamination of the product;

a fluid, in particular water, is introduced via the combustion lances. Owing to the evaporation of the water, the temperature increase of the coal can be limited accordingly;

shorter combustion lances are used or a radial arrangement is provided. Owing to these measures, smaller surfaces of the combustion lances are produced, whereby the coal is accordingly heated to a lesser degree;

provision is made for simultaneous firing of coal and gas. In this instance, the coal and gas are supplied at the same time via the combustion lances. The smaller the thermal power of the gas were, the higher is the mass flow thereof which would cool the coal.

Other embodiments of the invention are described in greater detail below with reference to a specific embodiment.

BRIEF DESCRIPTON OF THE DRAWINGS

Figure 2:
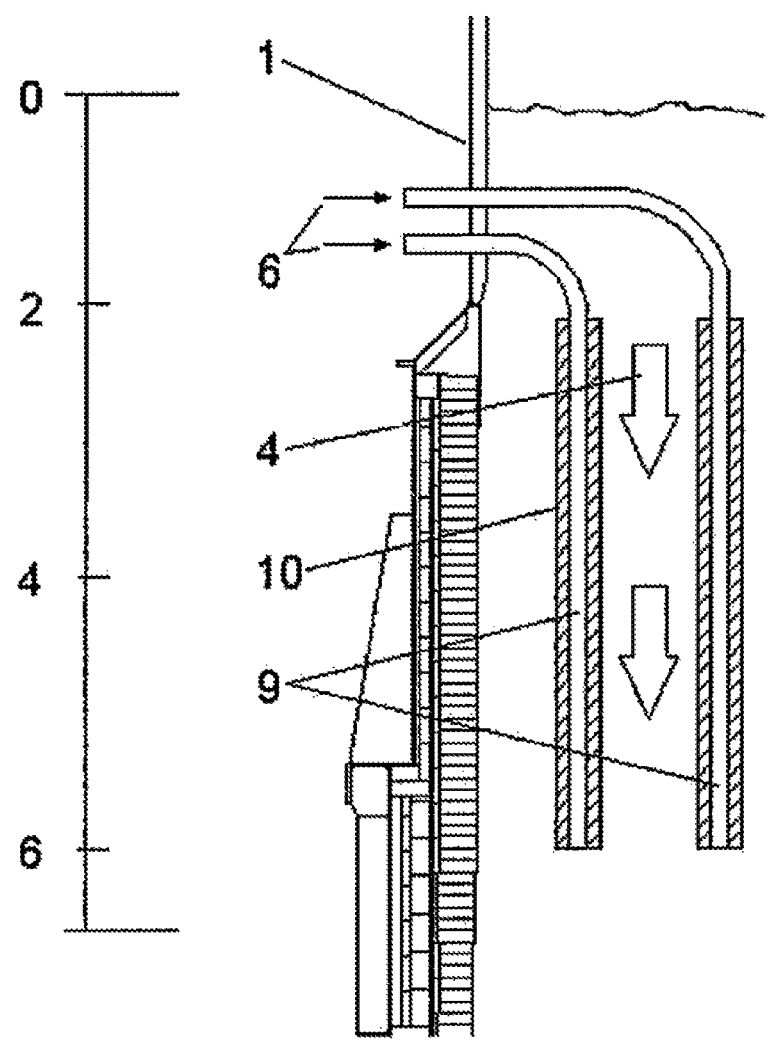
Figure 3:
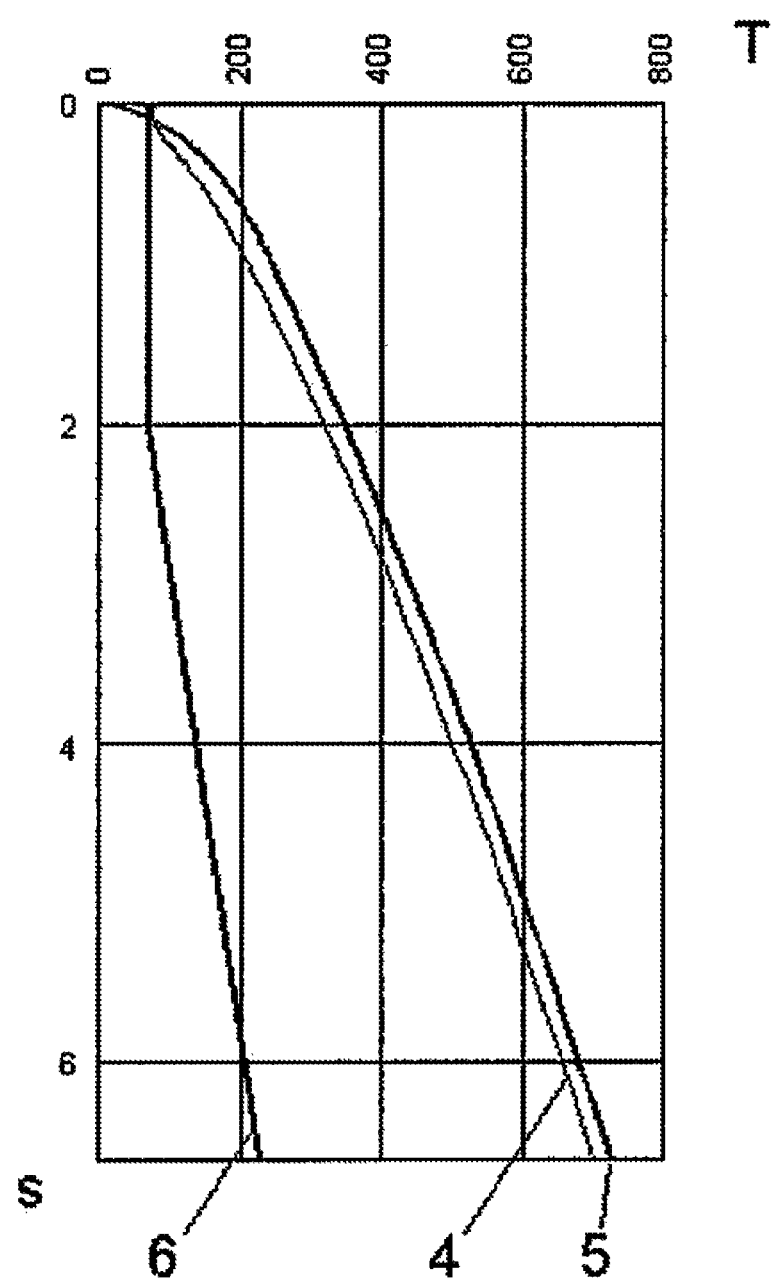

In the drawings:

FIG. 1 is a cross-section of a co-current/counter-current regenerative lime kiln, FIG. 2 is an enlarged detailed illustration in the region of the combustion lances, and FIG. 3 is a graph which shows the path of the temperature along the kiln axis.

DETAILED DESCRIPTION OF ILLUSTRATIVE EMBODIMENTS

FIGS. 1 and 2 illustrate a co-current/counter-current regenerative lime kiln which has two shafts 1, 2 each having a preheating zone V, a combustion zone B and a cooling zone K and an overflow channel 3 which connects the two shafts. Both shafts are operated alternately in a manner known per se as a combustion shaft and an exhaust gas shaft, combustion air 4 being supplied to the combustion shaft in co-current with fragmented material 5 and coal 6 to be burnt. The fragmented material in this instance is limestone. The hot exhaust gases 7 which are produced in this instance are directed together with the heated cooling air 8 which is supplied from below via the overflow channel 3 into the exhaust gas shaft, where the exhaust gases are directed upwards in counter-current to the limestone and preheat the limestone. After a predetermined period of time, for example, of 15 minutes, the function of the two shafts is transposed, that is to say, the combustion shaft becomes the exhaust gas shaft and vice versa. This method allows very efficient burning of the limestone in co-current with the combustion gases and a regenerative preheating of the limestone in counter-current to the hot exhaust gases.

The coal 6, which has a swelling index >1, in particular also >2, is supplied via combustion lances 9.

The combustion lances 9 are, in the embodiment illustrated, arranged in the region of the preheating zone V substantially in the direction of the longitudinal shaft axis 1a and are surrounded by the limestone. The fuel is supplied in the form of coal powder using a transport gas via the combustion lances and is heated owing to the heat which is transmitted inwards from the limestone via the wall of the combustion lances so that the coal 6 is automatically ignited after being discharged from the combustion lance 9 with the combustion air 4 which is introduced into the shaft from the top. In order to now prevent the occurrences of blockage feared with the use of coal having a swelling index >1 in the combustion lances 9, appropriate measures must be taken so that the coal in the combustion lances is kept below a temperature value at which melting phases of the coal used form. Depending on the coal used, this temperature value is, for example, 250° C. By means of adaptation to a temperature value of 200° C. or even 150° C., the occurrences of caking with all previously known types of coal can be prevented.

A particularly advantageous measure for reducing the heating of the coal in the combustion lances 9 involves the use of an insulation 10 of the combustion lance. Alternatively or in addition, it is also possible to use one or more of the other measures already mentioned above.

The graph according to FIG. 3 illustrates the path of the temperature of the supplied coal 6, the combustion air 4 and the fragmented material (limestone) 5 along the kiln axis 1a. The region of the preheating zone from the surface of the limestone to be burnt as far as the lower end of the combustion lances 9 is illustrated in this instance.

In this embodiment, the temperature of the coal reaches approximately 200° C. at the outlet of the combustion lances 9. The limestone and the combustion air 4 are heated in this region to approximately 700° C.

The invention claimed is:

1. Method for burning fragmented material in at least one shaft which comprises a preheating zone, a combustion zone and a cooling zone, coal being supplied to the at least one shaft via combustion lances, the coal having a swelling index greater than 1 and forming melting phases if heated above 250° C., wherein the temperature of the coal is maintained below 250° C. while in the combustion lances to prevent formation of melting phases of the coal.

2. Method according to claim 1, characterised in that the combustion lances are arranged in the preheating zone or the combustion zone of the shaft and are in operational contact with the fragmented material located there in order to heat the coal in the combustion lances.

3. Method according to claim 1, characterised in that the temperature of the coal in the combustion lances is kept below 200° C.

4. Method according to claim 1, characterised in that the combustion lances are provided with an insulation.

5. Method according to claim 1, characterised in that the combustion lances are cooled.

6. Method according to claim 1, characterised in that the coal is cooled before being supplied to the combustion lances.

7. Method according to claim 1, characterised in that the coal is supplied with a transport gas via the combustion lances and the temperature of the coal is adjusted by means of the quantity and or temperature of the transport gas.

8. Method according to claim 1, characterised in that non-combustible components, in particular CaO or CaCO3-containing components, are introduced into the combustion lances in order to adjust the temperature of the coal.

9. Method according to claim 1, characterised in that a fluid, in particular water, is introduced into the combustion lances in order to adjust the temperature of the coal.

10. Method according to claim 1, characterised in that the combustion of the fragmented material is carried out in a co-current/counter-current regenerative lime kiln, which has at least two shafts each having a preheating zone, a combustion zone and a cooling zone and an overflow channel which connects the two shafts, the two shafts being operated alternately as a combustion shaft and an exhaust gas shaft.

11. Method for burning fragmented material in at least one shaft which comprises a preheating zone, a combustion zone and a cooling zone, coal being supplied to the at least one shaft via combustion lances, the coal having a swelling index greater than 1 and forming melting phases if heated above 200° C., wherein the temperature of the coal is maintained below 200° C. while in the combustion lances to prevent formation of melting phases of the coal.

12. Method for burning fragmented material in at least one shaft which comprises a preheating zone, a combustion zone and a cooling zone, coal being supplied to the at least one shaft via combustion lances, the coal having a swelling index greater than 1 and forming melting phases if heated above 150° C., wherein the temperature of the coal is maintained below 150° C. while in the combustion lances to prevent formation of melting phases of the coal.

\* \* \* \* \*